Aug. 19, 1941.  J. A. ORSINO  2,253,247

STORAGE BATTERY

Filed March 14, 1939

INVENTOR.
JOSEPH A. ORSINO
BY
ATTORNEYS

Patented Aug. 19, 1941

2,253,247

UNITED STATES PATENT OFFICE 2,253,247

STORAGE BATTERY

Joseph A. Orsino, Cleveland, Ohio, assignor to Willard Storage Battery Company, Cleveland, Ohio, a corporation of West Virginia Application March 14, 1939, Serial No. 261,739

1 Claim. (Cl. 136—144)

This invention relates to storage batteries particularly of the lead-acid type, and has especial reference to the so-called dry storage batteries containing an absorbent which receives and holds the electrolyte so as to avoid the likelihood of spillage of the electrolyte if the battery is held or supported in other than its normal upright position.

The principal object of the present invention is to provide an improved form of electrolyte absorbent which in finely divided form is adapted to be mixed with the electrolyte so as to provide a semi-liquid mixture which can be poured and molded in the cell around the battery plates and which in a short time sets without perceptible shrinkage into a highly porous mass which is entirely inert and has no detrimental effect whatever on the plates and which, on the other hand, is believed to have a favorable action on the plates in the way of maintaining the capacity of the plates and extending the life of the battery.

My improved absorbent may be used with or without separators, as will be explained in the specification, and while it is preferably poured into the battery container so as to embed the plates or the plates and separators if the latter are utilized and leave no unoccupied space in the container to a level above the plates, nevertheless in one of the aspects of the invention my improved absorbent may be molded into plate separators of any of the usual forms, such as plain or flat, ribbed or corrugated, and adapted to be individually inserted between the battery plates as ordinary separators.

Briefly considered, my invention comprises the use of an electrolyte absorbent composed chiefly of the organic non-polysaccharidic portion of the cell walls of woods and other vegetable substances, and among the specific materials that may be used for this purpose are finely divided lignin, humic acid, dried sulphite pulp liquors, or a combination of two or more of them. The absorbent material is preferably mixed with the electrolyte, generally sulphuric acid, so as to form a semi-liquid mixture which can be poured into a battery cell or otherwise molded.

The invention is not confined to any particular battery construction, but in the accompanying sheet of drawings I have shown slightly different ways in which the subject matter of the invention may be used and in which—

Figure 2:
Fig. 2 is a transverse sectional view of the same along the line 2—2 of Fig. 1, the cell shown in Figs. 1 and 2 for the sake of simplicity being shown as provided with one positive plate and one negative plate only.
Figure 3:
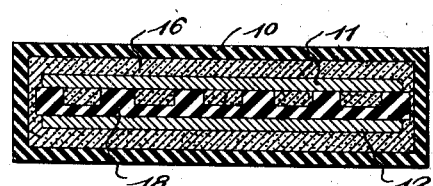
Figure 4:
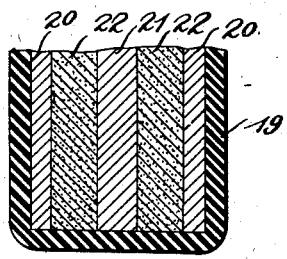

Fig. 3 is a view similar to Fig. 2 showing a modification wherein the absorbent material is used in conjunction with any of the well known porous separators which are commonly placed between plates; and Fig. 4 is a fragmentary vertical section of a lower part of a cell showing a modified form of the invention wherein the electrolyte absorbent is composed of flat molded plates inserted between the positive and negative plates of the cell.

As stated above, my improved absorbent is composed chiefly of the organic non-polysaccharidic portion of the cell walls of woods or other vegetable substances, and finely divided lignin, humic acid, or the dried sulphite pulp liquors or a combination of them have been mentioned as some of the specific materials which may be employed. If lignin is utilized, it may be formed in the manner described in the T. A. Willard Patent No. 1,505,990 and if humic acid is employed, it may be formed in any of the ways described in the W. L. Reinhardt Patent No. 1,817,846, but other methods of producing these materials may be employed. I may also employ a lignin derivative such as described in either of the Hibbert and Reinhardt Patents Nos. 2,079,207 and 2,079,208, or, as stated above, combinations of any of the materials stated above may be employed.

For the raw material I may employ finely divided woods and other finely divided vegetable substances. Among the woods which may be used might be mentioned oak, spruce, poplar, cedar, etc., and among the other vegetable substances might be mentioned corn stalks, corncobs, and leaves of vegetables and plants of various kinds.

Each of the absorbents mentioned above consists of a very finely divided powder generally brown in color.

Assuming that my absorbent is used in a battery of the lead-acid type wherein the electrolyte proper is sulphuric acid, the following procedure is carried out. The finely divided absorbent is mixed with sulphuric acid of a suitable specific gravity and with the absorbent and acid in suitable proportions. This is done by pouring the acid into a container into which a quantity of the absorbent was previously placed and constantly agitating the mass as the acid is added. I prefer to use sulphuric acid having a specific gravity of 1.300, and very good results have been obtained with the proportions of 50 grams of the absorbent, such as lignin, to 70 c. c. (91 grams) of sulphuric acid. Such a mixture is sufficiently fluid to pour as soon as it is mixed and has the consistency of fairly thin mud. It can be readily poured and it sets in about twenty-four hours without material shrinkage into a fairly solid but porous mass. So far as I can determine, no chemical action takes place during the period of setting. While the proportions above mentioned are desirable, it is not necessary that they be adhered to. For example, I have tried out a mixture of the absorbent and the acid in the proportions of 50 grams of the absorbent to 50 c. c. of acid. This can be used but it does not pour as readily as is the case with the proportions first mentioned. I have also used a higher percentage of acid than that first mentioned, but I find that the mixture does not set as readily or in quite as desirable a manner as when the ratio of 50 grams of absorbent to 70 c. c. of acid is employed.

While I prefer to use sulphuric acid having a specific gravity of 1.300, acid having a somewhat lower or a somewhat higher specific gravity may be employed. One advantage of using an acid having a higher specific gravity is that it is hydroscopic and will absorb moisture to replace that which has been lost by evaporation. However, acid of a specific gravity of 1.300 seems to give the best results from the standpoints of battery capacity and battery life.

The advantages of this absorbent are that it is highly porous, it is wholly inert to the battery plates and, I believe, it serves to maintain the capacity of the plates since in batteries formed of this material the capacity is maintained to a higher degree or to a greater extent than in the case of a wet battery using ordinary separators even though lignin or comparable material is introduced into the paste as an expander, as mentioned in the Willard, Reinhardt, and Hibbert and Reinhardt patents referred to above. A further important advantage or characteristic of my improved absorbent or combined absorbent and electrolyte lies in the fact that after the original setting of the mixture, on evaporation or oher loss of the electrolyte the mass or body of the absorbent retains the original shape to which it was molded and set and undergoes no preceptible shrinkage.

Figure 1:
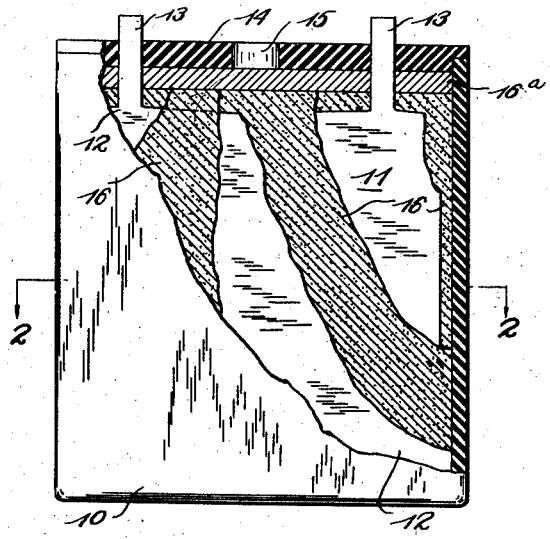
Fig. 1 is a side view of a battery cell with parts broken away to show the interior construction.

As stated above, my improved electrolyte absorbent or combined absorbent and electrolyte may be used in various ways and its utility is wholly independent of any structural details of the battery, and therefore in the drawings I have shown a one-cell battery more or less conventionally or diagrammatically. The battery illustrated in Figs. 1 to 3 has a case 10, one positive plate 11 and one negative plate 12, the plates having upstanding terminal posts 13 extending through openings in the cell cover 14 which is provided with a vent opening 15. In this instance the mixture of absorbent material and acid has been poured into the cell around the plates and thus molded around the latter so as to fill all the unoccupied space to a level above the plates. In Figs. 1, 2, and 3 of the drawing the absorbent or combined absorbent and electrolyte is designated by the reference character 16. Thus there will be no free acid in the battery and it can therefore be turned on its side or inverted without any danger of spillage. This is due not only to the fact that all space unoccupied by the plates is filled by the absorbent and the acid contained in it, but even though the unoccupied space were not taken up by the absorbent there would still be no free acid because of the high absorptive qualities of the absorbent.

I may, if desired, place over the top surface of the absorbent either before or after the mixture has set a strip 16a of porous material which may have the function of absorbing any excess water which may be added to the battery to replace that lost by evaporation and also to prevent possible injury to the absorbent by any instrument being inserted into the battery through the vent opening 15. The strip 16, which is fitted around the terminals 13 as shown in Fig. 1, may be formed of wood, rubber, or other suitable inert porous material.

In some instances it may be desirable to place ordinary separators, such as wood or porous or microporous rubber separators, between the plates before the mixture is poured into the container. The same results might be obtained by having the plates held apart by ribs molded on the end walls of the container so as to project inwardly for a suitable distance between the plates. The advantage of the use of independent separators is that it avoids the likelihood of the body of absorbent being punctured by severe buckling of the plates. In Fig. 3 I have shown the use of such a separator between the plates, the separator being designated 18. It will be understood that the absorbent-acid mixture will be poured into the container as above described, but in this instance will embed not only the plates but also the separator or separators. Inasmuch as the battery is otherwise the same as that shown in Figs. 1 and 2, a further description of Fig. 3 is unnecessary.

While I have shown in Figs. 1 to 3, a battery composed of a single cell and containing only one pair of plates, I wish it to be understood that the battery may have any number of cells and that each cell may have any desired number of plates.

My invention can be used in other ways than illustrated in the drawing where the mixture is poured into the container around the plates. For example, I may mold independent separators from the mixture. Generally, these will be flat on both sides and they are designed to be slipped into the spaces between the plates as are ordinary porous separators, and bear flat against the surfaces of the plates on opposite sides thereof. In view of the high porosity of these separators it is unnecessary to groove that face of the separator which is designed to bear against the positive plate since the gas evolved from the positive plate can escape through the body of the separator. This embodiment of the invention is illustrated in Fig. 4 which shows a cell having within the container 19 two negative plates 20 which in this instance bear against the side walls of the container and having one positive plate 21, the plates being spaced apart by separators 22 which in this instance are flat on both sides and engage the flat faces of the plates. These separators 22 are molded from the acid-absorbent mixture previously described. Additionally, it may be desirable to incorporate in these separators a small amount of a suitable binder such as sodium silicate, vinylite, Bakelite, or the like. I may also incorporate in the mass a fibrous material such as glass wool, cotton flock, asbestos, etc. If a binder such as any of those mentioned above is employed, only a small amount will be used. In small quantities the binder will not interfere with the porosity of the material to any considerable extent. It is to be understood that if the separator contains a binder or a fibrous material, or both, a minor amount of the binder and a minor amount of the fibrous material will be employed. In other words, the separator will be formed chiefly of the organic non-polysaccharidic portion of the cell walls of wood or other suitable vegetable material.

With all forms of the invention herein illustrated, including the embodiment shown in Fig. 4, there is no free electrolyte in the cell, the electrolyte being absorbed and therefore held in the absorbent whether it wholly surrounds the plates or is in the form of independently molded separators inserted between the plates and spacing them apart.

In view of the above it will be seen that my invention is susceptible of being used in various ways and in batteries of various types and designs, and I therefore aim in my claim to cover all modifications which do not involve a departure from the spirit and scope of the invention as defined in the appended claim.

Having thus described my invention, I claim:

A storage battery having an electrolyte absorbent composed chiefly of a body of finely divided humic acid.

JOSEPH A. ORSINO.